United States Patent
Madden et al.

(10) Patent No.: US 8,422,160 B1
(45) Date of Patent: Apr. 16, 2013

(54) HARMONIC SENSOR

(75) Inventors: Michael Madden, Mountain View, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/442,033

(22) Filed: Apr. 9, 2012

Related U.S. Application Data

(63) Continuation of application No. 13/190,036, filed on Jul. 25, 2011, now Pat. No. 8,154,820, which is a continuation of application No. 12/581,262, filed on Oct. 19, 2009, now Pat. No. 7,986,487.

(60) Provisional application No. 61/110,331, filed on Oct. 31, 2008.

(51) Int. Cl.
    *G11B 5/60* (2006.01)
(52) U.S. Cl.
    USPC .................................................. 360/75
(58) Field of Classification Search .................. None
    See application file for complete search history.

(56) References Cited

U.S. PATENT DOCUMENTS

| | | | |
|---|---|---|---|
| 4,777,544 A | 10/1988 | Brown et al. | |
| 5,377,058 A | 12/1994 | Good et al. | |
| 5,410,439 A | 4/1995 | Egbert et al. | |
| 5,909,330 A | 6/1999 | Carlson et al. | |
| 6,094,318 A | 7/2000 | Kim | |
| 6,097,559 A | 8/2000 | Ottesen et al. | |
| 6,249,393 B1 | 6/2001 | Billings et al. | |
| 6,411,458 B1 | 6/2002 | Billings et al. | |
| 6,717,764 B2 | 4/2004 | Lake | |
| 6,735,027 B2 | 5/2004 | Helsel et al. | |
| 6,785,081 B2 | 8/2004 | Chapin et al. | |
| 6,865,040 B2 | 3/2005 | Fayeulle et al. | |
| 6,898,034 B2 | 5/2005 | Dakroub et al. | |
| 6,930,844 B2 | 8/2005 | Yeh et al. | |
| 6,950,267 B1 | 9/2005 | Liu et al. | |
| 7,136,250 B1 | 11/2006 | Wu et al. | |
| 7,199,961 B1 | 4/2007 | Wu et al. | |
| 7,317,586 B1 | 1/2008 | Egan et al. | |
| 7,359,139 B1 | 4/2008 | Wu et al. | |
| 7,369,341 B2 | 5/2008 | Yokohata et al. | |
| 7,457,072 B2 | 11/2008 | Dieron et al. | |
| 7,518,820 B1 | 4/2009 | Wu et al. | |
| 7,522,360 B2 | 4/2009 | Imamura et al. | |
| 7,602,573 B2 | 10/2009 | Yang | |
| 7,605,997 B2 | 10/2009 | Yamazaki | |
| 7,773,336 B2 | 8/2010 | Che et al. | |
| 7,952,830 B2 | 5/2011 | Lee et al. | |
| 7,965,459 B2 | 6/2011 | Narayanan et al. | |
| 7,986,487 B1 | 7/2011 | Madden et al. | |
| 2002/0062466 A1 | 5/2002 | Noguchi | |
| 2003/0110344 A1 | 6/2003 | Szczepanek et al. | |
| 2007/0230001 A1 | 10/2007 | Imamura et al. | |
| 2009/0153996 A1 | 6/2009 | Ellis | |

*Primary Examiner* — Hoa T Nguyen
*Assistant Examiner* — James L Habermehl

(57) ABSTRACT

A system includes an input circuit, an analog to digital converter, first and second harmonic sensor modules, a head height control module, and a weighting function module. The input circuit receives analog signals from a read/write head. The analog to digital converter generates digital samples in response to the analog signals. The first and second harmonic sensor modules determine, from the digital samples, a first magnitude of a first frequency component and a second magnitude of a second frequency component, respectively. The head height control module estimates a height of the head over a storage medium in response to a comparison of the first magnitude and the second magnitude, and selectively adjusts the height in response to the estimated height. The weighting function module applies a time domain window function to the digital samples to create modified samples on which the first and second harmonic sensor modules operate.

18 Claims, 11 Drawing Sheets

HARMONIC SENSOR

CROSS-REFERENCE TO RELATED APPLICATIONS

This present disclosure is a continuation of U.S. Application Ser. No. 13/190,036, filed on Jul. 25, 2011, which is a continuation of Ser. No. 12/581,262, filed on Oct. 19, 2009, which claims priority under 35 U.S.C. §119(e) to U.S. Provisional Application No. 61/110,331, filed on Oct. 31, 2008.

FIELD

The present disclosure relates to a data storage medium. More particularly, the present disclosure relates to using a harmonic sensor to determine fly height of a read/write head over the data storage medium.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Complex signals can be represented in a time and/or a frequency domain. Signals may be transformed from the time domain to the frequency domain and vice versa. Transformation from the time domain to the frequency domain may be implemented by a Fourier transform. The Fourier transform provides a spectrum of frequency components (i.e., spectra), referred to as "harmonics," each of which has a corresponding magnitude. Considered together, the signal spectra constitute a frequency domain representation of a given signal.

One notable use of such a transformation, is to electronically determine the fly height of a read/write head in a hard disk drive (HDD). The fly height is the height of the head relative to a recording medium.

Methods for detecting fly height generally employ detecting a known pattern written on the storage medium. In response to detecting the pattern, the head produces a signal. A ratio in harmonic magnitude of the fundamental frequency (i.e. first harmonic (Fc)) and corresponding third harmonic (3Fc) of the signal may directly correlate to a change in fly height ($\Delta D$) of the head. This relationship may be expressed as:

$$\Delta D = |3Fc| \div |Fc|$$

In storage media systems, fly height of the head is often maintained within a prescribed region. If the fly height is too great, the signals transmitted and read by the head may be too weak for accurate data storage and retrieval. If the fly height is too small, the head may physically contact the medium, causing damage to the medium and/or loss of the data stored on the medium.

SUMMARY

A fly height control system includes a weighting function module. The weighting function module applies coefficients from a window function in a time domain to digital samples to provide weighted samples. A first of the coefficients is applied to a first of the digital samples and a second of the coefficients is applied to a second of the digital samples. The first of the coefficients has a first magnitude that is different than a second magnitude of the second of the coefficients. The system also includes a harmonic sensor module to estimate a magnitude of a frequency in a frequency domain based on the weighted samples. The system also includes a head height control module determine a height of a read/write head over a storage medium based on the magnitude of the frequency.

In other features, the frequency in the frequency domain is a first frequency; and the harmonic sensor module is a first harmonic sensor module. The system further comprises a second harmonic sensor module to estimate a magnitude of a second frequency in the frequency domain based on the weighted samples. The head height control module determines the height of the read/write head over the storage medium based on the magnitude of the first frequency and the magnitude of the second frequency.

In other features, the first harmonic sensor module performs a first discrete Fourier transform on the weighted samples to estimate the magnitude of the first frequency. The second harmonic sensor module performs a second discrete Fourier transform on the weighted samples to estimate the magnitude of the second frequency.

In other features, the head height control module determines the height of the read/write head over the storage medium based on a ratio of the magnitude of the first frequency to the magnitude of the second frequency. The head height control module adjusts the height of the read/write head over the storage medium when the ratio indicates that the height of the read/write head over the storage medium is outside of a predetermined range. The first frequency corresponds to a first harmonic of at least one data pulse from the read/write head, and the second frequency corresponds to a third harmonic of the at least one data pulse.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
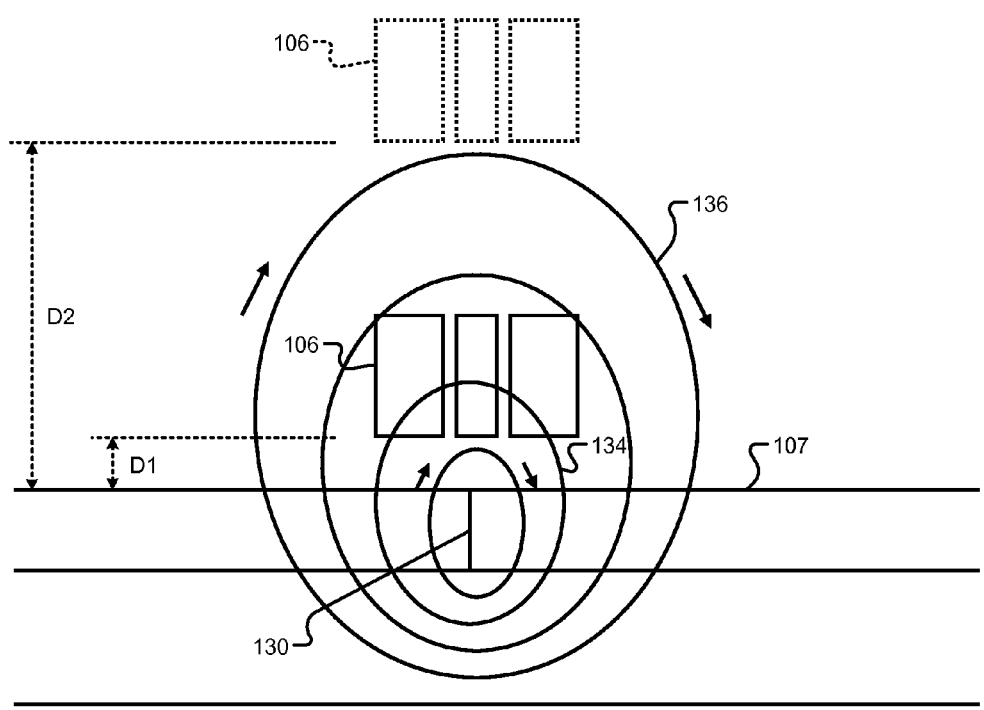
FIG. 1 is a high level schematic diagram of a read/write head for a hard disk drive.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Typically, predetermined test patterns are written and then read-out of a storage medium as pulses. The pulses are used determine and adjust fly height of a transducer over the storage medium. An example of a transducer is a read/write head of a hard disk drive (HDD).

A read/write (R/W) channel (also referred to as a recording channel) of the present disclosure includes harmonic sensors. The harmonic sensors receive analog to digital samples from an analog to digital converter (ADC) that are based on pulses from the head. The harmonic sensors provide outputs that are used to estimate fly height based on random or pseudo-random data.

In one embodiment, the R/W channel applies a time-domain window over the ADC samples before they are received by the harmonic sensors. The time-domain window weights the ADC samples according to a predetermined pattern. Weighting may be provided by multiplying coefficients provided by the window function to incoming samples. The harmonic sensors use the windowed samples to estimate spectrums of signals from the head. The window reduces dependency of spectrum estimation of the harmonic sensors on the particular random data pattern written. An example of a random pattern is a data pattern written to a data field.

The harmonic sensors may provide discrete Fourier transforms (DFTs) at various frequencies based on the time-domain window and ADC samples. A head height control module may sum the DFTs for the various frequencies and estimate and adjust head height based on the sums, as will be discussed herein.

Referring now to FIG. 1, when writing data, a write current is generated that flows through the head 106. The write current is switched to produce a magnetic field having a positive or negative polarity. The positive or negative polarity is stored by the medium 107 as a magnetic transition representing data. In other words, a transition 130 indicates a transition from a positive polarity to a negative polarity or vice versa. When reading data, the head 106 provides a pulse based on the transition 130.

The pulse may correspond to a single transition pulse or a dibit transition pulse. For a dibit pulse, a binary "1" may be encoded as a pair of magnetic transitions spaced one bit apart. A binary "0" may be encoded as the absence of any transitions in a particular location on the medium 107.

In FIG. 1, the head 106 is illustrated at two different heights relative to the medium 107. The first height D1 corresponds to the head 106 flying close to the medium 107. The second height D2 corresponds to the head 106 flying further away from the medium 107 than at the first height.

As the head 106 flies close to the medium 107, magnetic field lines 134 are tightly bunched causing a sharp transition 130. In other words, the head 106 takes a relatively short amount of time to pass the field lines 134 over the transition 130 and provide a pulse based on the transition 130. Therefore, the pulse width (PW) may be relatively small.

When the fly height is higher, the field lines 136 are further apart, and the transition 130 maybe more gradual. In other words, the head 106 takes a relatively large amount of time to pass the field lines 136 over the transition 130 and provide a pulse based on the transition 130. The pulse width for the gradual transition may be larger than the pulse width for the sharp transition. Increases in pulse width have corresponding increases in pulse density. Thus, the pulse density, also referred to as channel bit density (CBD), may be higher for the gradual transition. Fly height may therefore be determined based on pulse density.

In one embodiment, $$CBD = PW_{50}/T. \tag{1}$$

T is the symbol duration and $PW_{50}$ is the pulse width at the half-amplitude point of the pulse. $PW_{50}$ for the head 106 may be approximated by:

$$PW_{50} \approx \sqrt{2g^2 + 4(d+a)^2} \tag{2}$$

where g is the gap of the head, a is the transition length, and d is the fly height. Once pulse density is known, equations (1) and (2) can be used to determine the fly height d. Thus, the higher fly height corresponds to a higher pulse density.

When the head 106 encounters a transition on the medium 107, the head 106 generates a signal s(t) that can be modeled by:

$$s(t) = \frac{1}{1 + \left(\frac{2t}{PW_{50}}\right)^2}, \tag{3}$$

where t is a time variable. The signal s(t) can be written as:

$$y(t) = \sum_m (u_m - u_{m-1})s(t - mT) + n(t). \tag{4}$$

$U_m$ is the data stream written onto the medium 107, spaced by time T, and n(t) is the noise in the signal. After ADC sampling, the discrete-time signal ($y_k$) can be written as:

$$y_k = y(kT) = \sum_m (u_m - u_{m-1})s(kT - mT) + n(kT). \tag{5}$$

$Y_k$ depends on s(t), which is a function of fly height d.

Pulses from the head 106 may be translated by harmonic sensors from the time domain to the frequency domain. A ratio of a low frequency in the pulse to a high frequency in the pulse, as represented in the frequency domain, may indicate a corresponding magnitude of pulse density. For example, a low frequency harmonic (e.g., first harmonic) may be selected, and a higher frequency harmonic (e.g., third harmonic) may be selected. Therefore, the ratio of harmonics may also be used to determine fly height, as will be further discussed regarding FIG. 2.

Figure 2:
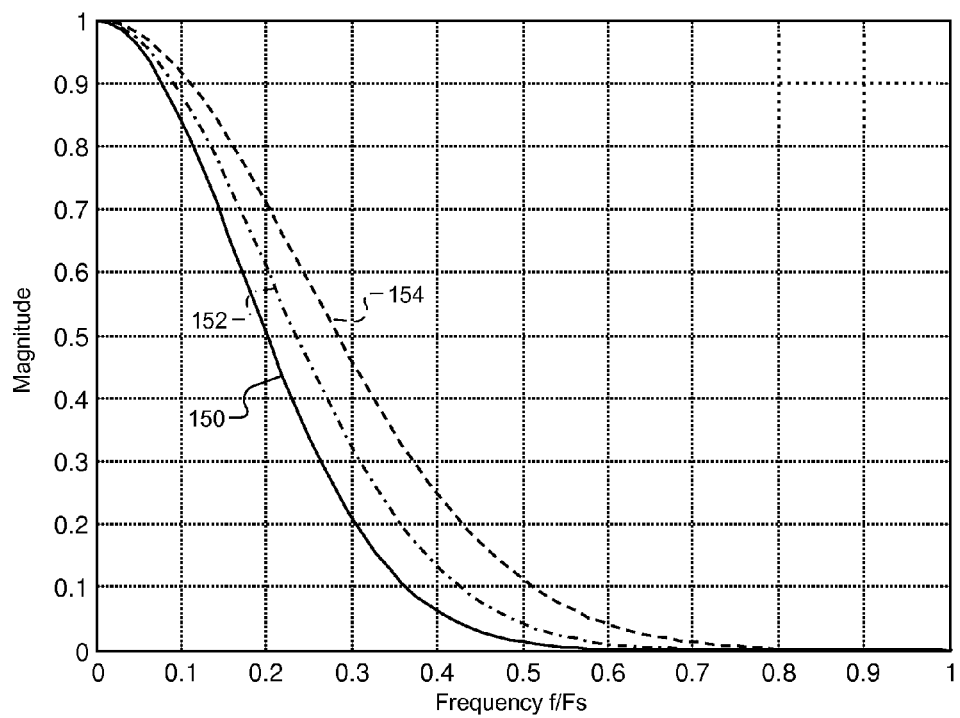
FIG. 2 illustrates a plot of magnitude versus frequency for various pulse densities.

Referring now to FIG. 2, as pulse density decreases, higher frequencies have more energy, and the ratio of the first harmonic to the third harmonic goes down. FIG. 2 illustrates a plot of magnitude versus frequency for various densities. Magnitudes can be calculated from a sum of Fourier series coefficients output from the harmonic sensors, as will be discussed herein.

Table 1 (provided below), which corresponds to FIG. 2, indicates that as the pulse density (K) increases, the ratio of the first harmonic (e.g., 1/8 Fs) to the third harmonic (e.g., 3/8 Fs) also increases.

TABLE 1

| K | f = 1/8 Fs | f = 3/8 Fs | Ratio |
|---|---|---|---|
| 0.80 | 0.87 | 0.30 | 2.96 |
| 1.00 | 0.82 | 0.17 | 4.87 |
| 1.20 | 0.76 | 0.09 | 8.77 |

A first density for the pulse is represented by curve 150, a second density for the pulse is represented by curve 152 and a third density for the pulse is represented by curve 154. The first density is higher than the second density, which is higher than the third density. As pulse density decreases, higher frequencies have more energy, and the ratio of the first harmonic to the third harmonic goes down. In other words, the density may be derived from the ratio of the first harmonic to the third harmonic.

In one embodiment, the distance between the head 106 and the medium 107 increases when this occurs, the amplitude of a signal, and particularly, a third harmonic of a pulse from the head 106 is decreased in the time domain. Accordingly, the magnitude of the third harmonic output from the harmonic sensor is also decreased in the frequency domain.

Therefore, the spectrum of the pulse, and in particular, the roll-off in the frequency domain, may indicate the density of the pulse. Roll-off corresponds to the rate of loss or attenuation of a signal beyond a certain frequency. The higher the density, the faster the roll-off, and the less energy left over in the pulse signal at higher frequencies. Therefore, fly height may also be determined based on roll-off. The window functions of the present disclosure may minimize effects of undesirable frequencies in the pulses. The window functions may therefore allow the harmonic sensors to more accurately translate the harmonics into the frequency domain.

Figure 3A:
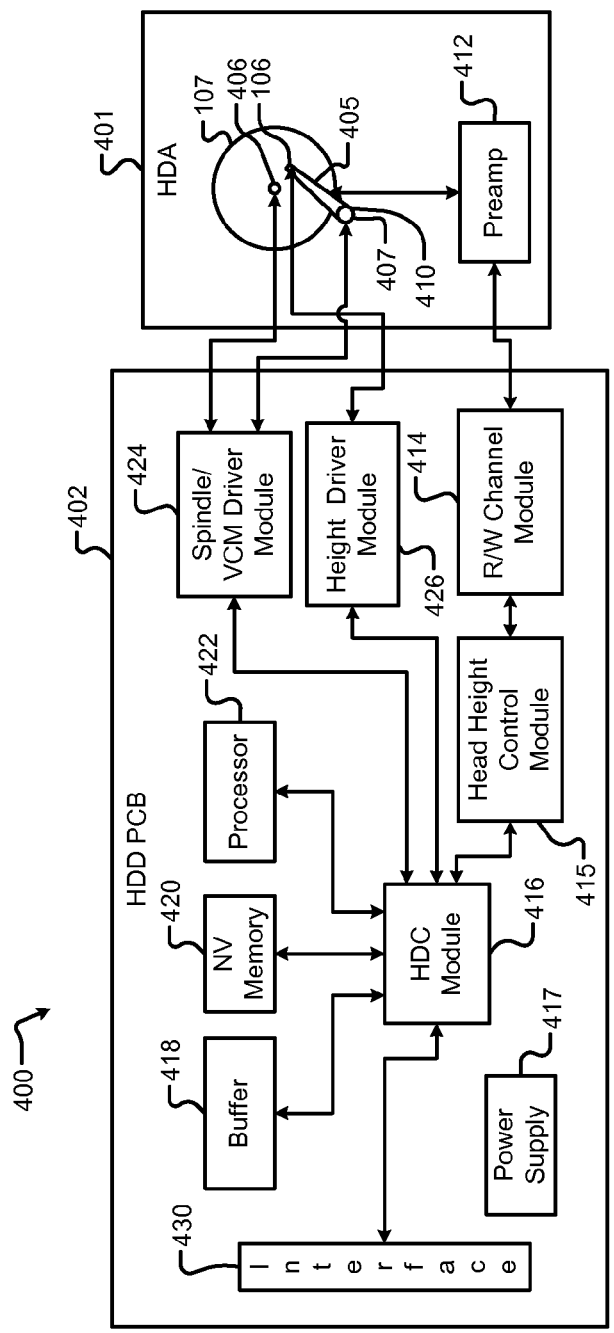
FIG. 3A is a block diagram of a hard disk drive system according to the present disclosure.

The teachings of the disclosure can be implemented in a hard disk drive (HDD) 400, an example of which is illustrated in FIG. 3A. The HDD 400 includes a hard disk assembly (HDA) 401 and a HDD PCB 402. The HDA 401 may include a storage medium 107, such as one or more platters that store data, and a read/write head 106. The head 106 may be arranged on an actuator arm 405 and may read and write data on the medium 107. The HDA 401 includes a spindle motor 406 that rotates the medium 107 and a voice-coil motor (VCM) 407 that actuates the actuator arm 405. The HDA 401 may also include a head height adjustment motor 410 that moves the head 106 closer to or further from the medium 107.

A preamplifier device 412 amplifies signals generated by the head 106 during read operations, and provides signals to the read/write head 106 during write operations. The head 106 transfers data to and/or from storage medium 107 by writing transition pulses to or reading transition pulses from the medium 107.

The HDD PCB 402 includes a R/W channel module 414, a head height control module 415, a hard disk controller (HDC) module 416, a buffer 418, nonvolatile memory 420, a processor 422, a spindle/VCM driver module 424 and a height driver module 426. The R/W channel module 414 processes data received from and transmitted to the preamplifier device 412. The HDC module 416 controls components of the HDA 401 and communicates with an external device (not shown) via an I/O interface 430. The external device may include a computer, a multimedia device, a mobile computing device, etc. (not shown). The I/O interface 430 may include wireline and/or wireless communication links.

The HDC module 416 may receive data from the HDA 401, the R/W channel module 414, the head height control module 415, the buffer 418, nonvolatile memory 420, the processor 422, the spindle/VCM driver module 424, and/or the I/O interface 430. The processor 422 may process the data, including encoding, decoding, filtering, and/or formatting. The processed data may be output to the HDA 401, the R/W channel module 414, the buffer 418, nonvolatile memory 420, the processor 422, the spindle/VCM driver module 424, and/or the I/O interface 430.

The HDC module 416 may use the buffer 418 and/or nonvolatile memory 420 to store data related to the control and operation of the HDD 400. The buffer 418 may include DRAM, SDRAM, etc. The nonvolatile memory 420 may include flash memory (including NAND and NOR flash memory), phase change memory, magnetic RAM, or multi-state memory, in which each memory cell has more than two states. The spindle/VCM driver module 424 controls the spindle motor 406 and the VCM 407. The height driver module 426 controls the head height adjustment motor 410 to move the head 106 closer to or further from the medium 107. The HDD PCB 402 includes a power supply 417 that provides power to the components of the HDD 400.

Figure 3B:
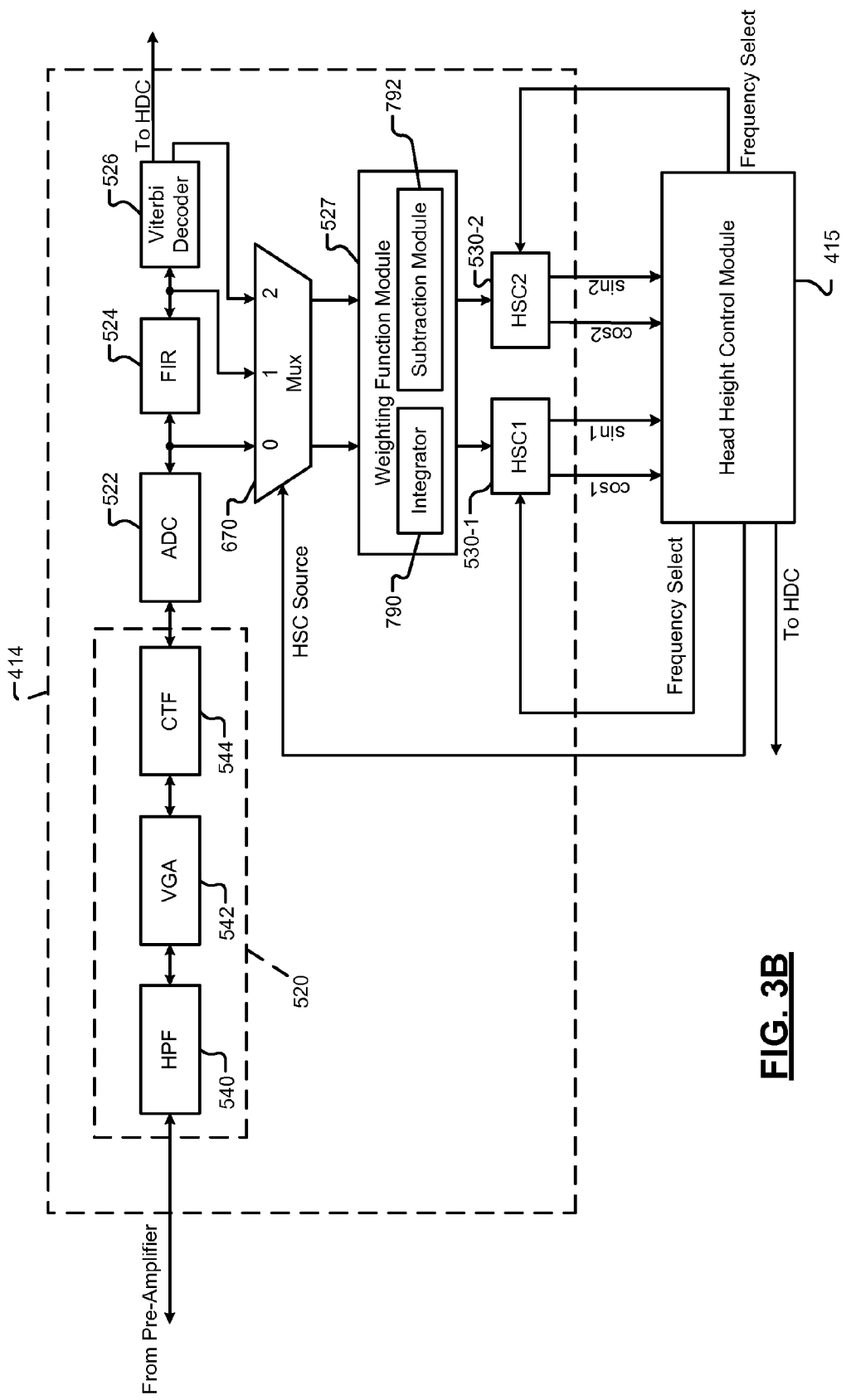
FIG. 3B is a block diagram of a R/W channel for the hard disk drive system according to the present disclosure.

Referring now to FIG. 3B, the R/W channel module 414 is shown in accordance with one embodiment of the present disclosure. The R/W channel module 414 includes an analog front end (AFE) module 520, an analog to digital converter (ADC) module 522, a finite impulse response (FIR) filter 524, a Viterbi decoder (VTB) 526, a weighting function module 527 and harmonic sensor circuit (HSC) 530-1, 530-2.

In operation, the R/W channel module 414 processes the signals from the head 106. To this end, the analog front end module 520 receives the data to/from the head 106 in the analog domain. For example, the analog front end module 520 receives and processes pulses from the pre-amplifier device 412. The analog front end module 520 may include a high pass filter (HPF) 540, a variable gain amplifier (VGA) 542 and a continuous time filter (CTF) 544.

Signals from the head 106 may be filtered and amplified through the HPF 540, VGA 542 and CTF 544. In one embodiment, the VGA 542 provides gain to signals provided from the head 106. The variable gain is controlled by an automatic gain control (AGC) loop (not shown). The VGA 542 provides control of the signal level such that the analog to digital conversion of the R/W channel module 414 is optimized. For example, increases in gain may avoid quantization noise which may impact bit error rate (BER) performance.

The CTF 544 may minimize aliasing, which may occur during analog to digital conversion. In one embodiment, the CTF 544 is a multiple pole low pass filter. The filter may be target matched with the FIR filter 524.

The ADC module 522, FIR filter 524 and Viterbi decoder 526 may perform data detection processes such as sequence detecting, bit recovery, parity processing, descrambling and the like. While FIG. 3B shows a FIR filter 524 and a Viterbi decoder 526, different types of filters decoders and/or various other digital backend components may be used.

The ADC module 522 converts the analog signals of the R/W channel module 414 to digital samples quantized in time and amplitude. The ADC module 522 may be clocked by a phase locked loop (not shown), which tracks the channel rate clock frequency.

In one embodiment, the FIR filter 524 includes a plurality of taps (or registers) and equalizes the samples from the ADC module 522. The Viterbi decoder 526 decodes the signal output from the FIR filter 524.

The HSC 530-1, 530-2 may each include a respective bank of correlators, which implement discrete Fourier transforms (DFTs) at selected frequencies.

In one embodiment, the HSC 530-1, 530-2 may include DFTs that translate the digital output of the ADC module 522 to sums of signal spectra. For example, the HSC 530-1, 530-2 may provide estimates of the sine and cosine components of the ADC module outputs, FIR filter outputs and/or Viterbi decoder outputs according to:

$$Y_{cos} = \sum_n D(n)\cos(2\pi n f_{HSC}) \quad (6)$$

$$Y_{sin} = \sum_n D(n)\sin(2\pi n f_{HSC}). \quad (7)$$

D(n) corresponds to ADC module outputs, FIR filter outputs and/or Viterbi decoder outputs (selectable via multiplexer 670), n is the sample index, $f_{HSC}$ is a selectable DFT frequency. In one embodiment, $f_{HSC}$ may be selected between 1/32 Fs and ½ Fs. Each HSC 530-1, 530-2 may have an independently selectable frequency.

In other words, the HSC 530-1, 530-2 may correspond to coarse spectrum analyzers where frequencies of interest (e.g., first and third harmonics) are selected. The frequencies are thus selected to estimate the energy in each frequency and to obtain a coarse picture of the spectrum signal.

In one embodiment, the HSC 530-1, 530-2 are illustrated separately for the purpose of explaining the derivation of first and third harmonic magnitudes. Various other HSC modules may also be included to obtain various other harmonic magnitudes. The HSC 530-1, 530-2 may not be limited to separate stages and can be implemented by a single HSC.

In one embodiment, a multiplexer (MUX) 670 is controlled by the head height control module 415 to provide the HSC 530-1, 530-2 with outputs from the ADC 522. The multiplexer 670 is also controlled to provide the HSC 530-1, 530-2 with outputs from the Viterbi decoder 526. Outputs of the Viterbi decoder 526 may be referred to as non-return-to-zero (NRZ) bits. Further, HSC 530-1, 530-2 may selectively receive outputs of FIR filter 524 based on MUX selection.

The head height control module 415 may align the estimates of the first and third harmonics before Viterbi processing with estimates made after Viterbi processing. In other words, the head height control module 415 may remove time offset between HSC estimations for ADC module outputs and Viterbi decoder outputs.

Figure 3C:
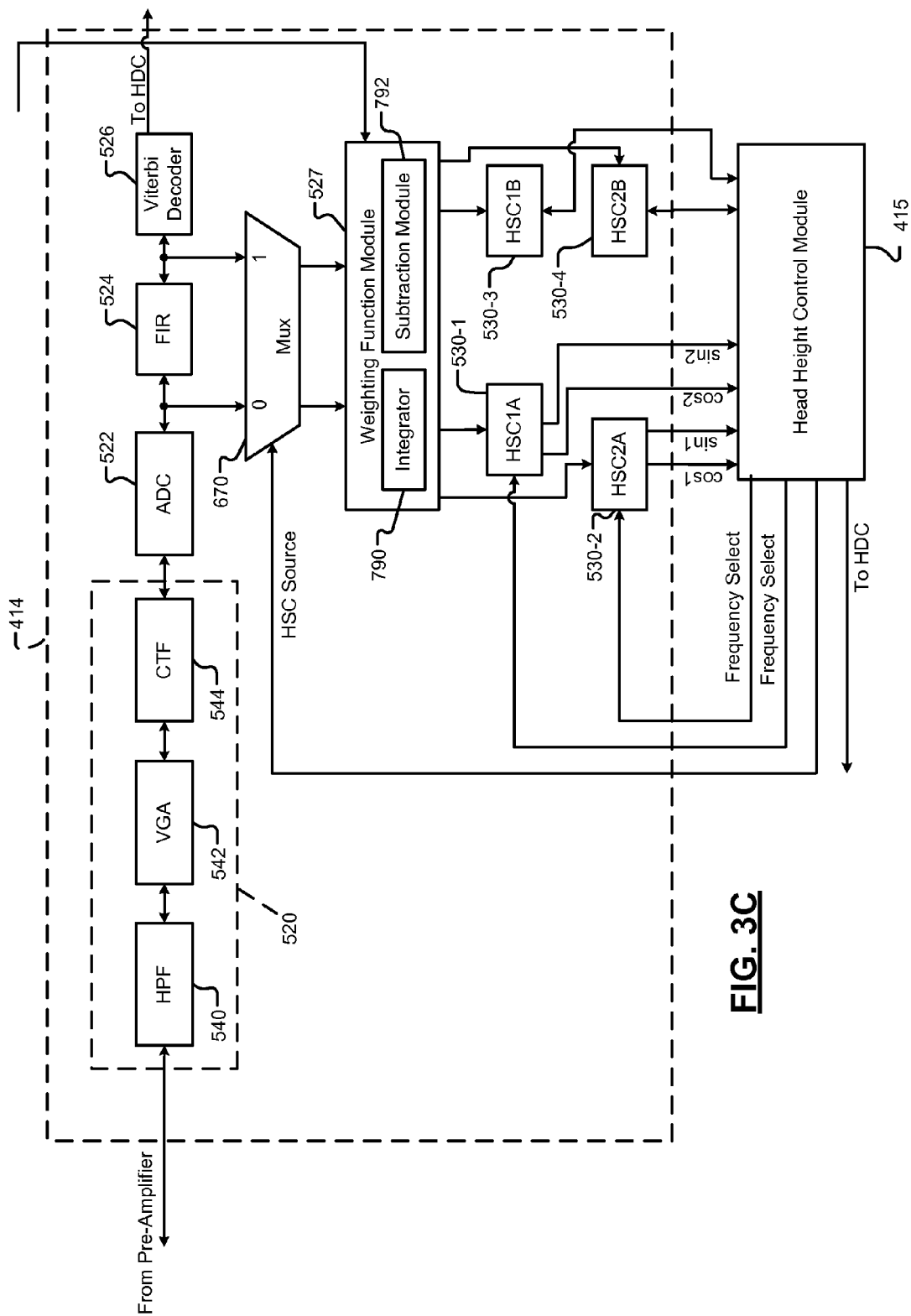
FIG. 3C is a block diagram of a R/W channel for the hard disk drive system according to the present disclosure.

Referring now to FIG. 3C, in one embodiment, the HSC 530-1, 530-2 estimate the first and third harmonics from ADC samples. HSC 530-3, 530-4 estimate the first and third harmonics, respectively for the samples after they are processed through the Viterbi decoder 526. The head height control module 415 may align the estimates of the first harmonic from the HSC 530-1 and the HSC 530-3. The head height control module 415 may also align the estimates of the third harmonic from the HSC 530-2 and the HSC 530-4. In other words, the head height control module 415 may remove time offset between ADC module outputs and Viterbi decoder outputs.

In one embodiment, the signal spectra are the first and third harmonic magnitudes of an applied signal. The output of HSC 530-1 is shown as (cos 1) and (sin 1). The output of HSC 530-2 is shown as (cos 2) and (sin 2). The head height control module 415 may express the magnitudes of the first and third harmonics:

$$Fc \text{ Magnitude} = \sqrt{\sin_1^2 + \cos_1^2} \quad (8)$$

$$3Fc \text{ Magnitude} = \sqrt{\sin_2^2 + \cos_2^2} \quad (9)$$

While shown as (sin) and (cos) output components, the magnitudes may be calculated directly by HSC 530-1 or HSC 530-2.

The head height control module 415 may divide the Fourier transform of the ADC samples by the Fourier transform of the Viterbi decoder for each harmonic. The resulting quotient may equal an estimate of the channel response including an estimate of the original pulse convoluted with the output of the analog front end 520 (Pulse*AFE). For example, $$\frac{FT(ADC)}{FT(NRZ)} = FT(\text{Pulse} * AFE). \quad (10)$$

After the spectrum of the bits (i.e., FT(NRZ)) is estimated based on the output of the Viterbi decoder 526, the estimate is divided out from the spectrum of the samples (i.e., FT(ADC)). The head height control module 415 normalizes (i.e., divides) the ADC spectrum by the NRZ spectrum to generate a relatively smooth estimate of the channel response.

In the present disclosure, the HSC 530-1, 530-2 generate estimates based on data that is not necessarily based on a predetermined pattern and that may or may not be random. For example, the ADC module 522 may provide digitized data that corresponds to written user data written in data sectors on the medium 107. In other words, the data may correspond to normal read data and not test track data and may be provided in real-time as the head 106 is reading the data.

The weighting function module 527 applies a weighting function in the time domain to inputs to the HSC 530-1, 530-2. Windowing corresponds to multiplication in the time domain, which is convolution in the frequency domain. In the frequency domain, the spectrum is a series of narrow sync functions over the frequencies of interest with side lobes at nearby frequencies.

Figure 4:
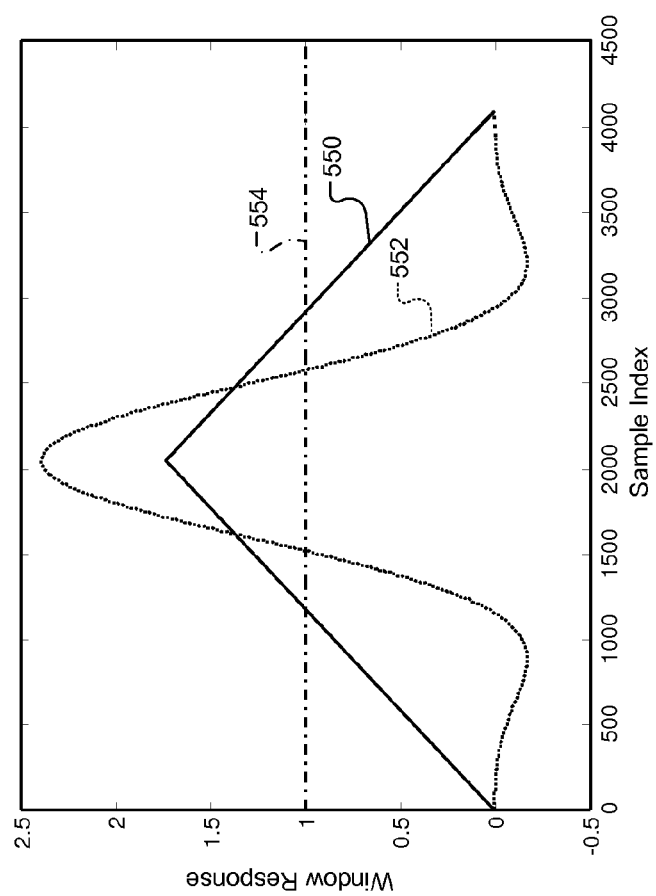
FIG. 4 illustrates examples of time domain window functions according to the present disclosure.

Referring now to FIG. 4, examples of time domain window functions are illustrated. The window functions include a triangle window 550, a flat-top window 552 and a rectangular window 554. The windows 550, 552, 554 are illustrated over a plurality of samples (i.e., 4000 samples). In practice, the windows 550, 552, 554 may provide coefficients that are multiplied by respective ones of the incoming samples, thereby weighting the incoming samples.

The rectangular window 554 corresponds to a window, where all samples are given the same weight. The flat-top window 552 weights samples that are determined to correspond to frequencies of interest, such as first and third harmonics, according to a sine or cosine functions. The flat-top window 552 weights remaining samples substantially less (e.g., 0) than the samples for the frequencies of interest. The triangle window 550 may weight the samples according to a linearly increasing function and then a linearly decreasing function. The two functions may meet at samples that are determined to correspond to a frequency of interest. In other embodiments, almost any window function that weights samples for areas of interest greater than other samples may be used according to the present disclosure.

Figure 5:
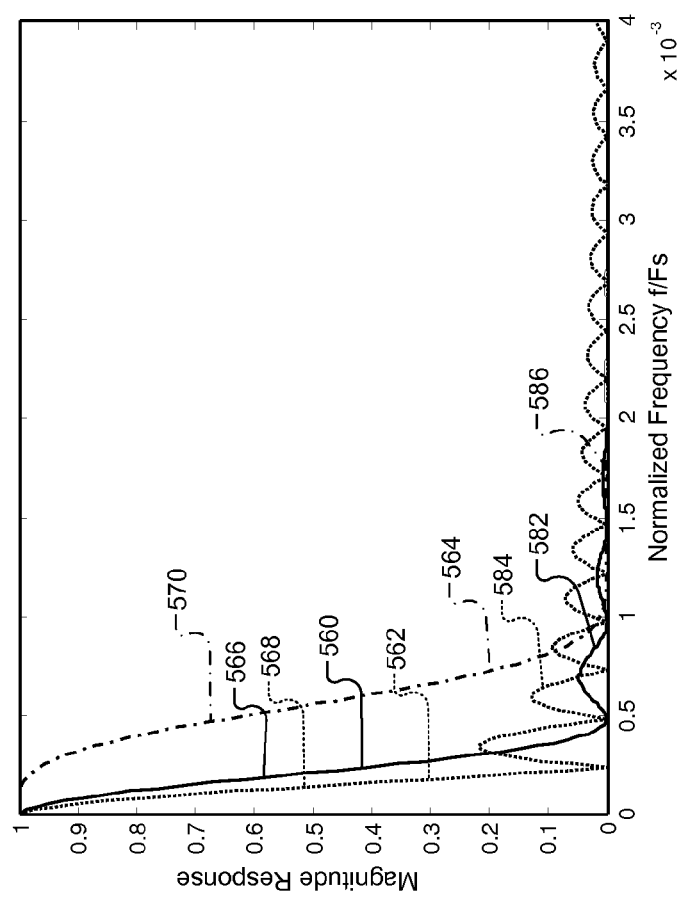
FIG. 5 illustrates a comparison of window function spectra according to the present disclosure.

Referring now to FIG. 5, a comparison of window function spectra is illustrated. The spectrum 560 of the triangle window 550, the spectrum 562 of the flat-top window 552 and the spectrum 564 of the rectangular window 554 are illustrated. The main lobe 566 of the triangle window 550 has a smaller normalized frequency range than the main lobe 568 of the flat-top window 552 and the main lobe 570 of the rectangular window 554. The side lobes 582 of the triangle window 550 have smaller magnitudes than the side lobes 584 of the flat-top window 552 but larger magnitudes than the side lobes 586 of the rectangular window 554. In one embodiment, the frequency range of the main lobe and the magnitude of the side lobes may be minimized to minimize influence from frequencies that are not of interest.

In one embodiment, as in FIGS. 3B-C, the weighting function module 527 includes an integrator module 790 to implement the window function 550. For example, the integrator module 790 may provide a linearly changing output based on a constant. The integrator module 790 may therefore integrate the constant until the mid-point (e.g., halfway through the total amount of samples for a pulse) of the window 550 is reached. A subtraction module 792 may then subtract out integral values until zero (or some other initial state) is reached. The weighting function module 527 may multiply the changing coefficients by incoming samples.

Figure 6:
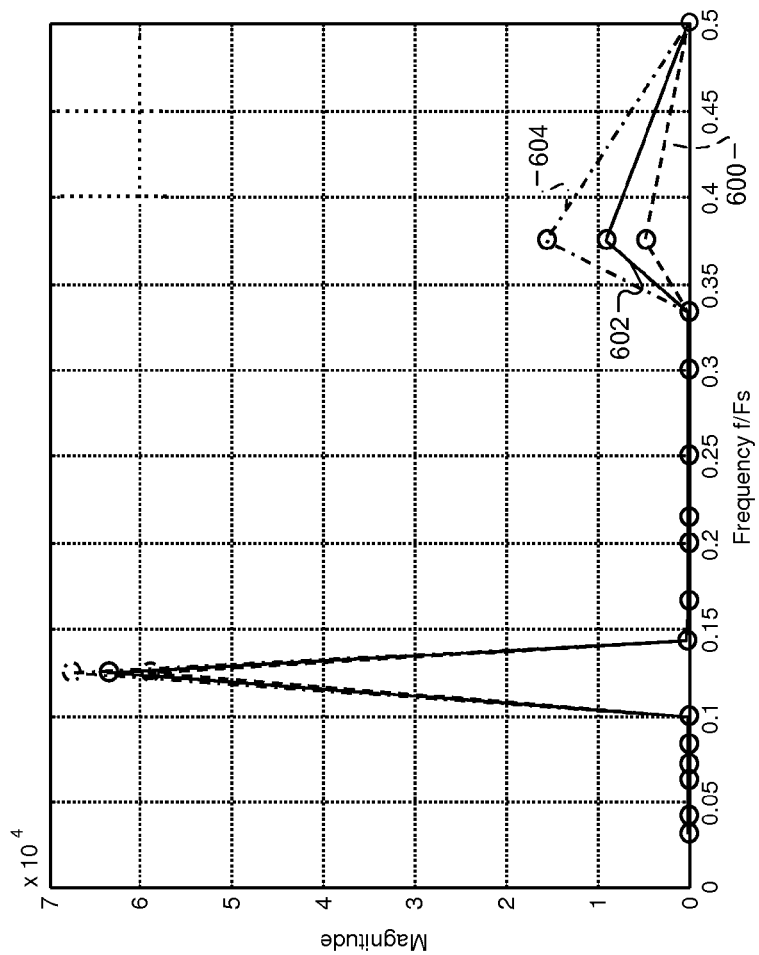
FIG. 6 illustrates harmonic ratios for a 4T pattern according to the prior art.

Referring now to FIG. 6, as mentioned, dedicated tracks were, in the past, typically written on media with repeating test patterns. The repeating test patterns were then read out to determine density. An example of a repeating pattern is a 4T pattern, which includes four ones and four zeros repeating. T is the duration of one bit.

Previous HSC modules would generate estimates based on the 4T pattern as output from an ADC module. An example of harmonic ratios for HSC module outputs for various pulse densities is shown in Table 2 (provided below) and FIG. 6. In FIG. 6, HSC module harmonic ratios 600, 602, 604 are illustrated for a 4T pattern for densities K=0.8, 1 and 1.2, respectively.

TABLE 2

| K | f = 1/8 Fs | f = 3/8 Fs | Ratio |
|---|---|---|---|
| 0.80 | 6.76 | 1.557 | 4.34 |
| 1.00 | 6.359 | 0.915 | 6.95 |
| 1.20 | 5.902 | 0.471 | 12.53 |

Figure 7:
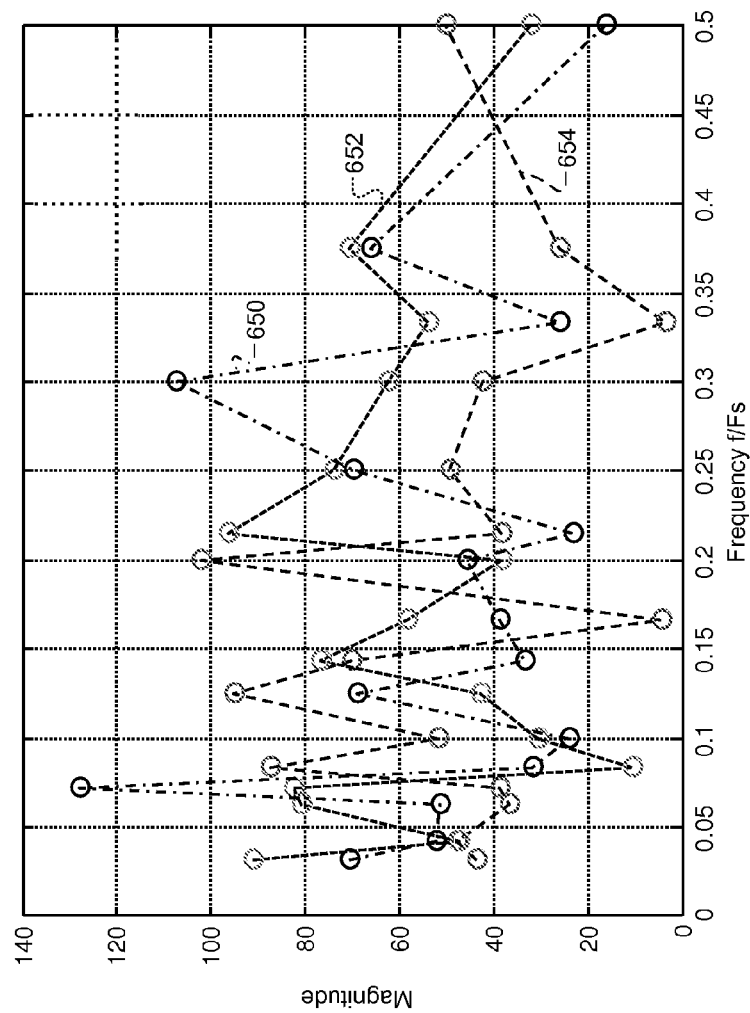
FIG. 7 illustrates magnitude versus frequency for random patterns absent window function weighting.

Referring now to FIG. 7, the HSC 530-1, 530-2 may provide estimates that are not focused on frequencies of interest absent weighting of pulse data. For example, magnitude versus frequency for three random patterns 650, 652, 654 are illustrated. As can be seen, it may be difficult to render accurate approximations of pulse density based on the random patterns as compared with the 4T patterns of FIG. 6. In other words, FIG. 7 provides a graph of estimates for a system that does not include the 4T patterns of FIG. 6 or the weighting function module 527 of the present disclosure. The addition of the weighting of pulse data by the weighting function module 527 clarifies frequencies of interest, in contrast to the random patterns of FIG. 7. This is because particular frequencies are weighted by the weighting function module 527 so that other non-weighted frequencies do not substantially affect frequency analysis, unlike in FIG. 7.

Figure 8:
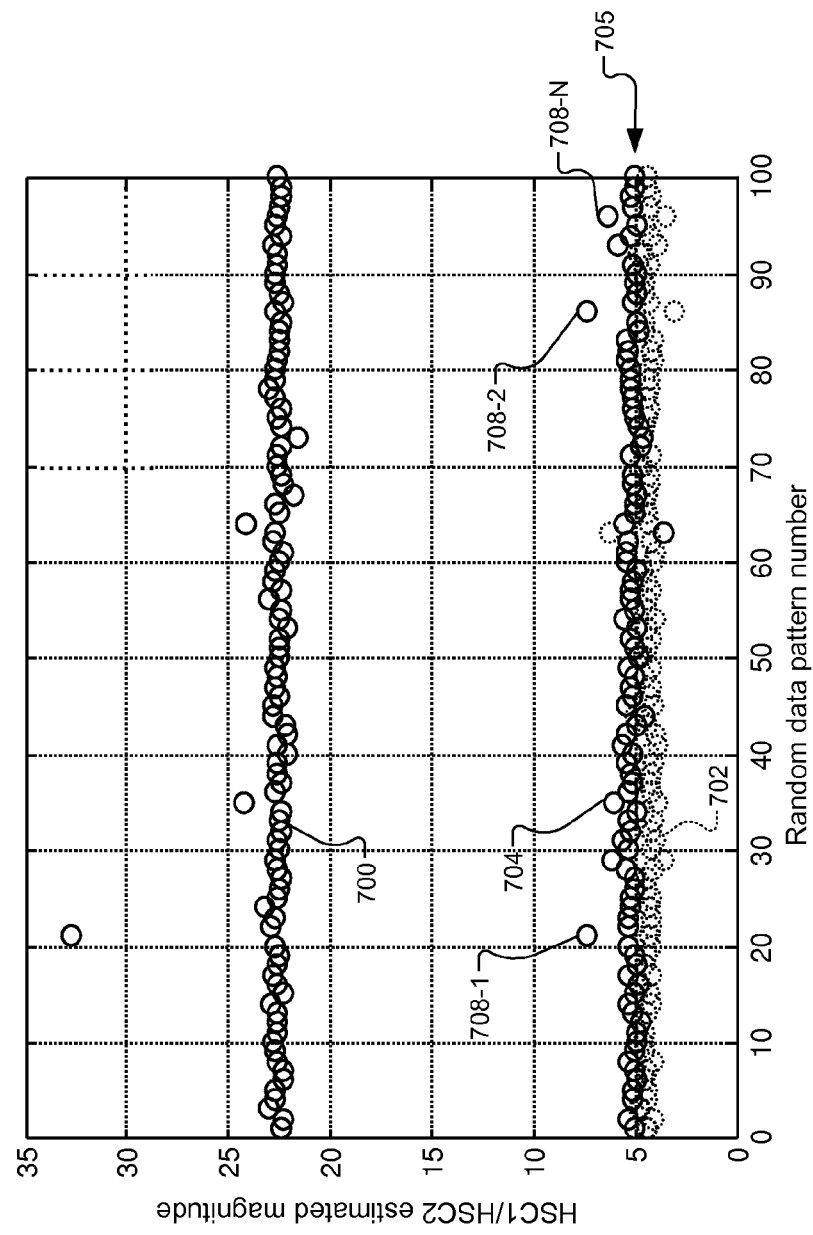
FIG. 8 illustrates a magnitude of the output of a first harmonic sensor module divided by a magnitude of the output of a second harmonic sensor module for various patterns absent window function weighting.

Referring now to FIG. 8, for various random patterns, the magnitude of the outputs 700 of HSC 530-1 may be divided by the magnitude of the outputs 702 of HSC 530-2. The division results in ratios 704. FIG. 8 illustrates one hundred random patterns where each pattern has a length of one typical data sector. Each circle in FIG. 8 represents a measurement of the magnitude of the first harmonic, the third harmonic, or a ratio of the first and the third harmonics.

The ratios 704 include several outliers 708-1, 708-2, . . . , and 708-N (referred to as outliers 708). Further, from pattern to pattern, there are variations. The outliers 708 and variations are caused by changes in the pattern of a pulse from trial to trial. Thus, the amount of energy in the frequencies of interest (such as the first and third harmonics) changes for particular areas of a disk due to random data. The weighting function module 527 is included in the present disclosure to smooth out the curve 705 corresponding to the ratios 704 and remove the outliers 708.

In this manner, the reconstructed spectrum from random data may be used to estimate harmonic ratios (i.e., ratios of the magnitude of the output of the HSC 530-1 to the magnitude of the output of HSC 530-2, as represented by curve 705). As mentioned, a ratio of a low frequency in the pulse to a high frequency in the pulse, as represented in the frequency domain, may indicate a corresponding magnitude of pulse density, which corresponds to head height.

Figure 9:
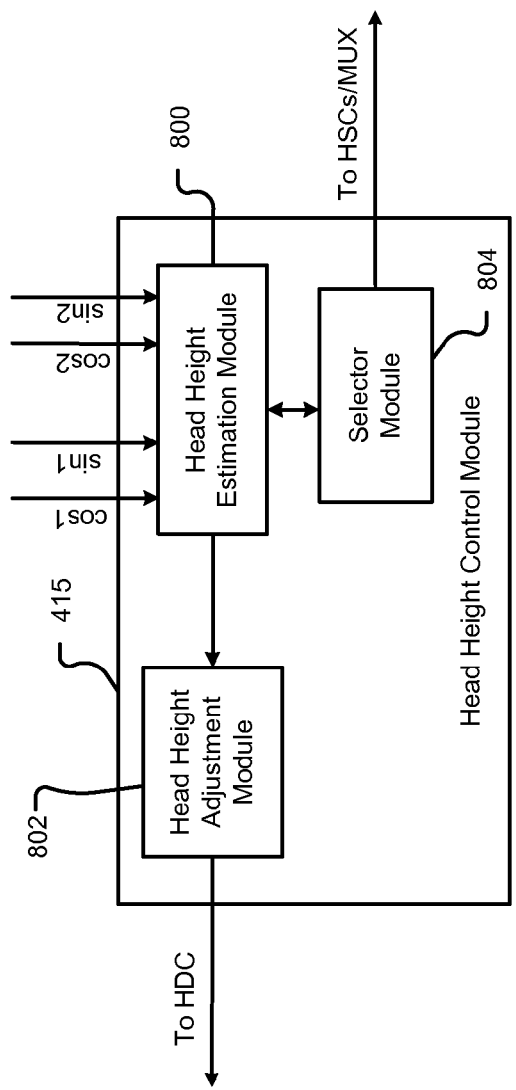
FIG. 9 is a block diagram of a head height control module according to the present disclosure.

Referring now to FIG. 9, the head height control module 415 controls the distance between the head 106 and the storage medium 107. A head height estimation module 800 estimates current head height based on window adjusted signals from the HSC 530-1, 530-2, such as those illustrated in curve 705 of FIG. 8. For example, the head height estimation module 800 determines pulse density based on the HSC module signals and compares the pulse density to a previous pulse density. The head height estimation module 800 may determine changes in height based on differences between the stored pulse density and the current pulse density based on the HSC signals.

A head height adjustor module 802 determines what, if any, head height adjustments should be made based on the head height estimation from the head height estimation module 800. The head height adjustor module 802 may compare the estimated head height to a predetermined range of heights. If the fly height is too great (i.e., above the predetermined range), the signals transmitted and read by the head may be too weak for accurate data storage and retrieval. If the fly height is too small (i.e., below the predetermined range), the head may physically contact the medium. Contacting the medium may cause physical damage to the medium and/or loss of the data stored on the medium. For example, if the head height adjustor module 802 determines that the head 106 is flying too low to the medium 107 such that impact may be imminent, the head height adjustor module may adjust the height of the head 106 upwards.

The head height control module 415 may also include a selector module 804 that selects frequencies for the HSC 530-1, 530-2 and that controls the multiplexer 670.

In one embodiment, the head height control module 415 may determine the ratio of the first harmonic to the third harmonic from HSCs and may translate the ratio into a corresponding pulse density. In an alternative embodiment, a single HSC estimates the sine and cosine components at one frequency. Head height is then measured by comparing the single frequency response to a pre-calculated or pre-calibrated level. Relative changes in head height may also be detected by detecting relative changes in the response at this single frequency.

Any processes descriptions or blocks in flow charts should be understood as representing specific aspects of module operation, or steps in the process. Alternate implementations are included within the scope of the exemplary embodiment of the present disclosure in which functions may be executed out of order from that shown or discussed, including substantially concurrently, depending upon the functionality involved.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
   an input circuit configured to receive analog signals from a read/write head flying over a storage medium;
   an analog to digital converter configured to generate digital samples in response to the analog signals received by the input circuit;
   a first harmonic sensor module configured to determine a first magnitude of a first frequency component in response to the digital samples;
   a second harmonic sensor module configured to determine a second magnitude of a second frequency component in response to the digital samples;
   a head height control module configured to
      estimate a height of the read/write head over the storage medium in response to a comparison of the first magnitude and the second magnitude, and
      selectively adjust the height of the read/write head over the storage medium in response to the estimated height of the read/write head over the storage medium; and
   a weighting function module configured to apply a time domain window function to the digital samples to create modified samples, wherein:
      the first harmonic sensor module is configured to determine the first magnitude in response to the modified samples, and
      the second harmonic sensor module is configured to determine the second magnitude in response to the modified samples.

2. The system of claim 1, wherein the time domain window function includes a first coefficient, a second coefficient, and a third coefficient, and wherein the first coefficient is different from the second coefficient, the second coefficient is different than the third coefficient, and the third coefficient is different than the first coefficient.

3. The system of claim 1, wherein the time domain window function comprises (i) a triangle window function or (ii) a flat-top window function.

4. The system of claim 1, wherein the head height control module is configured to estimate the height of the read/write head over the storage medium in response to a ratio of the first magnitude to the second magnitude.

5. The system of claim 1, wherein:
   the first frequency component corresponds to a first harmonic; and
   the second frequency component corresponds to a third harmonic.

6. The system of claim 1, wherein the head height control module is configured to control the height of the read/write head over the storage medium such that the estimated height of the read/write head over the storage medium stays within a predetermined range.

7. A system comprising:
   an input circuit configured to receive analog signals from a read/write head flying over a storage medium;
   an analog to digital converter configured to generate digital samples in response to the analog signals received by the input circuit;
   a first harmonic sensor module configured to determine a first magnitude of a first frequency component in response to the digital samples;
   a second harmonic sensor module configured to determine a second magnitude of a second frequency component in response to the digital samples;
   a head height control module configured to
      estimate a height of the read/write head over the storage medium in response to a comparison of the first magnitude and the second magnitude, and
      selectively adjust the height of the read/write head over the storage medium in response to the estimated height of the read/write head over the storage medium; and
   a Viterbi decoder configured to generate non-return-to-zero data in response to the digital samples, wherein the head height control module is configured to normalize the digital samples by the non-return-to-zero data.

8. The system of claim 7, wherein the head height control module is configured to normalize a Fourier transform of the digital samples by a Fourier transform of the non-return-to-zero data.

9. The system of claim 7, wherein the head height control module removes time offset between the digital samples and the non-return-to-zero data.

10. A method comprising:
   receiving analog signals from a read/write head flying over a storage medium;
   generating digital samples in response to the received analog signals;
   determining a first magnitude of a first frequency component in response to the digital samples;
   determining a second magnitude of a second frequency component in response to the digital samples;
   in response to a comparison of the first magnitude and the second magnitude, estimating a height of the read/write head over the storage medium;
   selectively adjusting the height of the read/write head over the storage medium in response to the estimated height of the read/write head over the storage medium; and
   applying a time domain window function to the digital samples to create modified samples,
   wherein determining the first magnitude of the first frequency component comprises determining the first magnitude in response to the modified samples, and wherein determining the second magnitude of the second frequency component comprises determining the second magnitude in response to the modified samples.

11. The method of claim 10, wherein:
the time domain window function includes a first coefficient, a second coefficient, and a third coefficient; and
the first coefficient is different from the second coefficient, the second coefficient is different than the third coefficient, and the third coefficient is different than the first coefficient.

12. The method of claim 10, wherein the time domain window function comprises (i) a triangle window function or (ii) a flat-top window function.

13. The method of claim 10, wherein estimating the height of the read/write head over the storage medium comprises:
estimating the height of the read/write head over the storage medium in response to a ratio of the first magnitude to the second magnitude.

14. The method of claim 10, wherein:
the first frequency component corresponds to a first harmonic; and
the second frequency component corresponds to a third harmonic.

15. The method of claim 10, further comprising controlling the height of the read/write head over the storage medium such that the estimated height of the read/write head over the storage medium stays within a predetermined range.

16. A method comprising:
receiving analog signals from a read/write head flying over a storage medium;
generating digital samples in response to the received analog signals;
determining a first magnitude of a first frequency component in response to the digital samples;
determining a second magnitude of a second frequency component in response to the digital samples;
in response to a comparison of the first magnitude and the second magnitude, estimating a height of the read/write head over the storage medium;
selectively adjusting the height of the read/write head over the storage medium in response to the estimated height of the read/write head over the storage medium;
generating non-return-to-zero data in response to the digital samples; and
normalizing the digital samples by the non-return-to-zero data.

17. The method of claim 16, wherein normalizing the digital samples by the non-return-to-zero data comprises:
normalizing a Fourier transform of the digital samples by a Fourier transform of the non-return-to-zero data.

18. The method of claim 16, further comprising removing time offset between the digital samples and the non-return-to-zero data.

* * * * *